United States Patent [19]

Christ et al.

[11] Patent Number: 4,901,810
[45] Date of Patent: Feb. 20, 1990

[54] SAFETY DEVICE FOR SELECTIVITY TRACK-GUIDED OR ROAD TRAVELLING VEHICLES

[75] Inventors: Hubertus Christ, Langenargen; Klaus Nieman, Weizheim; Herbert Mehren, Freiberg, all of Fed. Rep. of Germany

[73] Assignee: Daimler-Benz Aktiengesellschaft, Stuttgart, Fed. Rep. of Germany

[21] Appl. No.: 167,123

[22] Filed: Mar. 11, 1988

[30] Foreign Application Priority Data

Mar. 11, 1987 [DE] Fed. Rep. of Germany ....... 3707732

[51] Int. Cl.$^4$ .............................................. B62D 1/26
[52] U.S. Cl. .................................. 180/131; 340/928; 246/473 R
[58] Field of Search ............... 180/131, 79; 104/244.1, 104/245, 247, 242; 246/19, 473, 218, 192; 340/905, 928

[56] References Cited

U.S. PATENT DOCUMENTS 4,554,874 11/1985 Thudt et al. ..................... 180/131

FOREIGN PATENT DOCUMENTS 3103488 1/1987 Fed. Rep. of Germany .

Primary Examiner—Charles A. Marmor
Assistant Examiner—Karin Tyson
Attorney, Agent, or Firm—Barnes & Thornburg

[57] ABSTRACT

The invention relates to a safety device for selectively track-guided or road-travelling vehicles, which safety device exhibits on the road side an optical indicator device switched by a control device and normally set to "stop" signalling. In order to permit a change of the vehicle from track-guided to non-track-guided operation only when the sensing rollers are fully retracted, the invention provides that both a monitoring device monitoring the assumed rest position of the sensing rollers and signal transmission device coupled therewith are provided on the vehicle side. The signal transmission device transmits a signal indirectly switching the optical indicator device temporarily to "go" only in the case of the sensing rollers occupying the rest position.

12 Claims, 2 Drawing Sheets

SAFETY DEVICE FOR SELECTIVITY TRACK-GUIDED OR ROAD TRAVELLING VEHICLES

BACKGROUND AND SUMMARY OF THE INVENTION

The invention relates to a safety device for selectively track-guided or road-travelling vehicles such as is described in the previously unpublished German Patent Application No. 36 41 708, for example.

In order to be able to monitor the correctly extended state of the sensing rollers during the entry into a track-guided road, and, if necessary to warn the driver in good time, it is proposed in the literature cited initially that a switch actuated by the sensing rollers should be arranged on each of the two transverse guide bars at the start of the track-guided road, which switches, when actuated jointly, switch the optical indicator device to "go". This is, therefore, a road side safety device, which comes into action upon a change of the vehicle from non-track-guided to track-guided operation.

In the inverse case, namely the change of the vehicle from the track-guided road onto normal public roads, it is likewise of great importance, for reasons of safety, that the sensing rollers are retracted into the rest position. For, particularly when negotiating bends or when approaching stopping places, in the case of sensing rollers still occupying a work position near the ground, collisions with high curb edges may occur, as a result of which the steering mechanism of the vehicle may be damaged. In order to prevent this, in the case of sensing rollers not retractably mounted, predetermined breaking points have been provided in the mounting (German Patent Specification No. 31 03 488) and energy-absorbing catching devices have been connected in parallel in order to retain a broken sensing roller on the vehicle. However, this arrangement is difficult to realize in the case of retractable sensing rollers.

An underlying object of the invention is to provide a safety device for selectively track-guided or road-travelling vehicles with retractable transverse guide rollers which permits a change from track-guided to non-track-guided operation only when the sensing rollers are fully retracted to their rest position.

This object is achieved according to the invention by arranging an optical indicator device beyond the exit point of the track-guided road, providing a vehicle side monitoring device for monitoring the position of the sensing rollers, and providing a signal transmission device for indirectly switching the optical indicator device to a "go" signal only when the sensing rollers are in their rest position. The vehicle side monitoring device monitors the assumption of the rest position by the sensing rollers. When the sensing rollers are located fully in the rest position, the likewise vehicle side signal transmission device, which is coupled to the monitoring device, generates a signal which indirectly switches the optical indicator device arranged behind the exit point of the track-guided road temporarily to "go". On the other hand, if the sensing rollers are still in the work position near the ground, or if they have been transferred only partly towards the rest position, then no signal changing over the optical indicator device is generated by the signal transmission device, and the "stop" signal ahead of the access to the public road system remains.

According to an advantageous development of preferred embodiments of the invention, a signal transmission device may be arranged additionally on the road side, which device, via a likewise additional signal receiving device on the vehicle side, triggers the transfer of the sensing rollers into the rest position after the exit of the vehicle from the track-guided road but before the optical indicator device is reached. By this means, it is possible to execute this sensing roller adjustment in a quite specific route section without action on the part of the vehicle driver. It is thus possible to exclude a premature retraction of the sensing rollers still within the track-guided road due to an operating error on the part of the driver.

To permit the signal transmission between vehicle side and road side parts of the safety device to be realized with the smallest possible structural outlay, the signal transmission may occur wirelessly, for example by means of road side and vehicle side transmission and receiving devices, according to certain preferred embodiments.

Other objects, advantages and novel features of the present invention will become apparent from the following detailed description of the invention when considered in conjunction with the accompanying drawings.

DETAILED DESCRIPTION OF THE DRAWINGS

Figure 1:
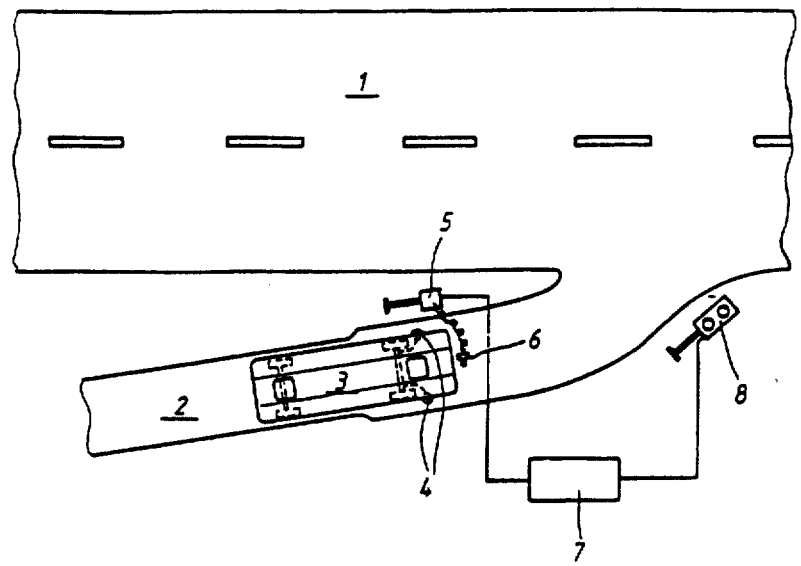
FIG. 1 shows a plan view of the exit point of a track-guided road with a safety device arrangement constructed in accordance with a preferred embodiment of the invention.

FIG. 1 shows a normal public road 1, a track-guided road 2 leading indirectly into the road 1, a selectively track-guided or road-travelling vehicle 3 with right-hand drive and having sensing rollers 4, travelling out of the track-guided road 2. Road side parts of a safety device are also depicted in FIG. 1, including a column 5 installed at the driver side road edge, a removable control pin 6 in flexible electrically conductive communication with this column 5, a control device 7 and an optical indicator device 8.

Figure 2:
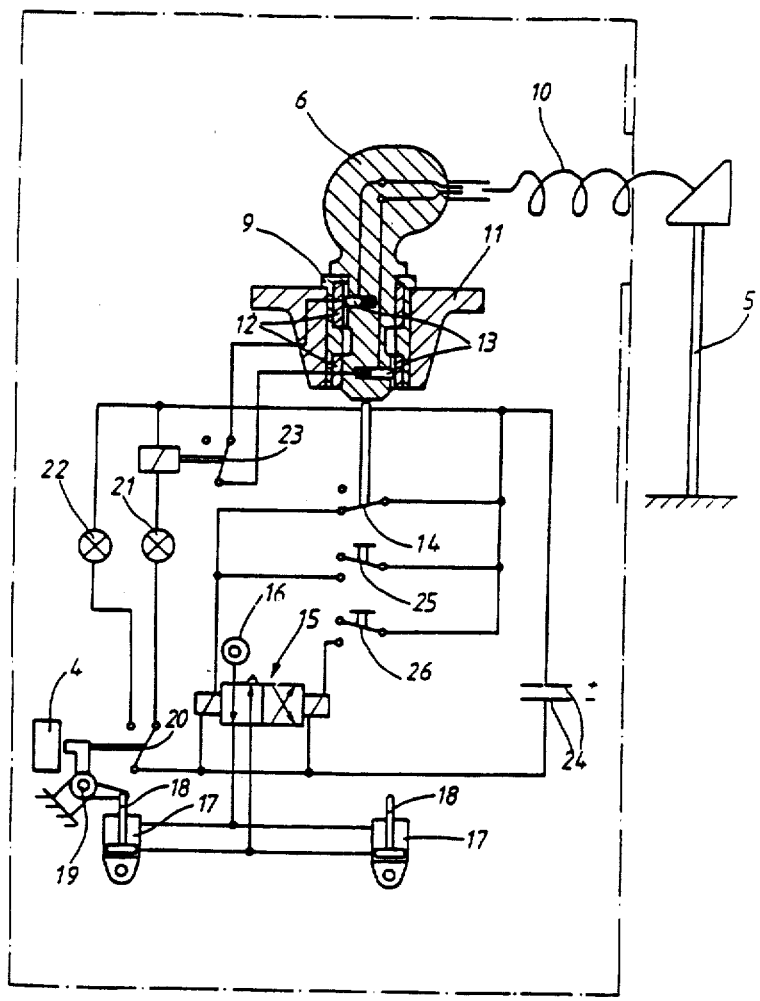
FIG. 2 shows diagrammatically the vehicle side parts of the safety device and the road side column with removable control pin of the arrangement of FIG. 1.

When leaving the track-guided road 2, the driver stops his vehicle 3 within arms length of the column 5. He removes the control pin 6 from the column 5 and plugs it into a socket 9 (FIG. 2) arranged in the interior of the vehicle. This process triggers the adjustment of the sensing roller into the rest position (FIG. 2). When the sensing roller rest position is assumed, an electrical signal is likewise transmitted via the control pin 6 to the column 5 and on to the control device 7. This control device 7 thereupon switches the optical indicator device 8 temporarily to "go", so that after plugging the control pin 6 back into the column 5 the vehicle 3 can turn into the public road 1.

This procedure of stopping the vehicle beside the column 5 and manipulating the control pin in the manner just described in order to trigger the "go" signal, which at first sight appears somewhat complicated, possesses the substantial advantage that the driver is made emphatically aware, by the stopping and the restarting, that a change in the mode of operation of the vehicle from automatic self-steering to driver-steered operation is taking place. The control pin 6 virtually fulfills the function of a driver readiness indicator, by the operation of which the driver indicates his readiness to take over completely the driving of the vehicle. The optical indicator device 8 then acknowledges this driver readiness together with the report back of the sensing rollers occupying the rest position, with the "go" signal.

FIG. 2 shows, in addition to the vehicle side parts of the safety device, the column 5 installed at the driver side road edge with the removable control pin 6. The control pin 6 is connected to the column 5 by the flexible cable 10 and exhibits at its end which engages into the socket 9 of the instrument panel 11, two radially outwardly extending spring contacts 13 which cooperate with two contact rings 12 of the socket 9. In the plugged-in state, the control pin 6 actuates, by its end face, a switCh 14 which, via a relay-actuated multiway valve 15, causes compressed air or hydraulic fluid to flow out of the vehicle side pressurized fluid connection 16 into the two adjusting cylinders 17. The piston rod 18 of the cylinder piston sliding in the adjusting cylinder 17 engages the pivoting mechanism 19 for the sensing roller 4, pivoting mechanism 19 and sensing roller 4 being show for only one side of the vehicle in FIG. 2, it being understood that a corresponding structure is provided at both sides. For the purpose of monitoring the sensing roller rest position, the pivoting mechanism 19 is provided with a limit position switch 20 which actuates signal lamps 21 and 22 arranged in the driver's field of vision and a relay-controlled switch 23 in series with the signal lamp 21. This switch 23 is again connected to the contact rings 13 of the socket 9 and therefore, via the control Pin 6, to the column 5 of the road side safety device. The signal lamps 21 and 22 and the relay to actuate the multiway valve 15 and the switch 23 are connected to the vehicle side voltage source 24. The manual switches 25 and 26 for the manual retraction and extension of the sensing rollers are likewise included in this vehicle circuit.

In order to retract the sensing rollers into the rest position, the driver of the vehicle plugs the control pin 6 into the socket 9 of the instrument panel 11. The control pin 6 then actuates the switch 14 and the latter in turn actuates the relay which adjusts the multiway valve 15 into the flow direction illustrated in FIG. 2. Pressurized medium then flows out of the pipe connection 16 into the chambers on the piston rod side of the adjusting cylinders 17, whereby the cylinder piston, the pivoting mechanism 19 and the sensing roller 4 assume the rest position illustrated in FIG. 2. This rest position is monitored by the limit position switch 20 and indicated to the driver by the lighting-up of the, for example, green signal lamp 21. Simultaneously with the lighting-up of the signal lamp 21, the relay of the switch 23 is triggered, which then closes the circuit of the control pin 6, still open until then, via the contact rings 13 which are mutually conductively connected in this position of the switch 23. The signal generated by the closure of this control pin circuit is passed on via the flexible cable 10 and the column 5 to the control device 7, which then switches the optical indicator device 8 temporarily to "go". On the other hand, if the sensing roller 4 is not in the required rest position, then the relay triggering the switch 23 is not actuated and no signal is given to change over the optical indicator device to "go". The driver is therefore still refused entry into the public road.

In the exemplary embodiment of the invention according to FIG. 2, the vehicle side socket 9 with the switch 14 on the one hand, and the road side column 5 with the control pin 6 on the other hand, therefore serve simultaneously both as signal receiving device and as signal transmission device. The drive can also transfer the sensing rollers into their rest position without operating the control pin 6, by the manual switch 25 placed in parallel with the switch 14. On the other hand, with the manual switch 26 he can pivot the sensing rollers into the work position near the ground, whilst the relay connected to this switch 26 triggers the multiway valve 15 so that the chambers of the adjusting cylinder 17 remote from the piston rod 18 are supplied with pressurized medium. In the case of sensing rollers occupying the work position, the limit position switch 20 closes the vehicle circuit and lights up the, for example, red signal lamp 22, whilst the control pin circuit remains open and the optical indicator device 8 continues to indicate the "stop" signal prohibiting progress.

Figure 3:
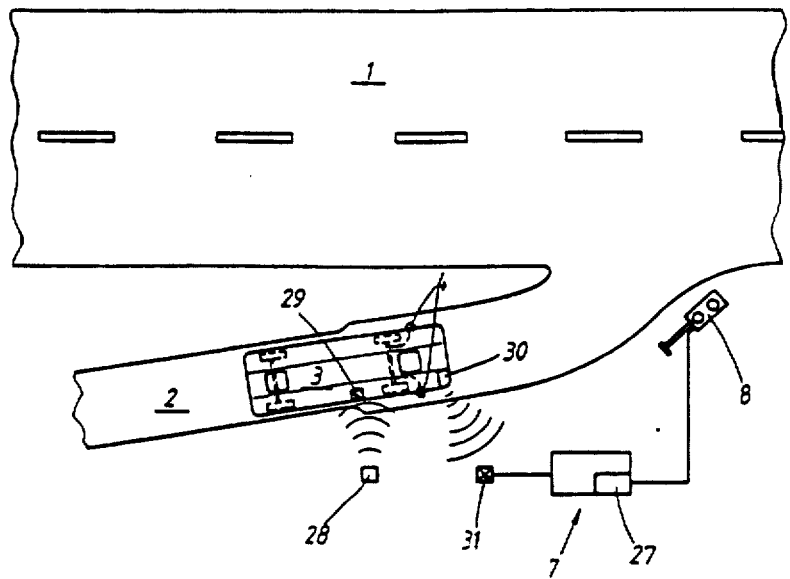
FIG. 3 shows a plan view of the exit point of a track-guided road, similar to FIG. 1 but referring to a further exemplary embodiment of the invention.

FIG. 3 illustrates an alternate embodiment wherein like reference numerals are used for features similar to corresponding features of FIGS. 1 and 2. FIG. 3 illustrates the track-guided road 2, the vehicle 3, the sensing rollers 4, the control device 7, the optical indicator device 8, as well as a time switch relay 27 integrated in the control device 7, a road side transmitter 28, a vehicle side receiver 29, a vehicle side transmitter 30 and a road side receiver 31.

When the vehicle 3 leaves the track-guided section 2, the vehicle side receiver 29 receives the signals of the road side transmitter 28, which are emitted as electromagnetic waves. In this context a deliberate positioning of the transmitter 28 at the road edge and of the receiver 29 on the vehicle ensures that the signals are not received by the receiver 29 before the sensing rollers 4 of the vehicle 3 have passed the end of the track-guided road 2. However, it is also contemplated in certain embodiments for the transmitter 28 to be activated only at this time by road side contacts actuated by the vehicle. The signals received by the receiver trigger the retraction process of the sensing rollers 4 into the rest position in a manner not shown in detail, for example, such as described above, the conjunction with the embodiment of FIGS. 1 and 2. A monitoring device, likewise not shown, which may be constructed in a particularly simple manner as a limit position switch, activates, when the sensing rollers 4 occupy the rest position, the vehicle side transmitter 30, the signals of which are then received by the road side receiver 31. This receiver 31 is connected to the control device 7, which then switches the optical indicator device 8 temporarily to "go". The transmission and reception frequencies are mutually coordinated here, so that mutual influence cannot occur. The temporary changeover of the optical indicator device 8 to the "go" signal may be realized in an expedient manner with a time switch relay 27 integrated in the control device.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. Safety device for selectively track-guided or non track-guided road travelling vehicles with sensing rollers rolling on lateral transverse guide bars of a track-guided road section, said sensing rollers being adjustably controlled and actuated by auxiliary power for movement between a work position near the ground when used in track-guided operation and a retracted rest position when used in non track-guided operation, said safety device comprising:

an optical indicator device disposed behind an exit point of a track-guided road section, said optical indication device being switchably controllable between a normal stop mode signal warning an approaching vehicle drive not to proceed on to an adjacent non-track guided road section and a go mode signal advising a vehicle driver that the vehicle may safely proceed onto the non track-guided road section;

monitoring means for monitoring whether the sensing rollers are in the work position or in the retracted rest position;

and control signal means responsive to the monitoring means for controlling the optical indicator device in such a manner as to switch the optical indicator device to the go mode signal only when the sensing rollers are in the retracted rest position.

2. Safety device according to claim 1, further comprising a sensing roller control device arranged adjacent the exit point of the track guided road section, said sensing roller control device including means for triggering a transfer of the sensing rollers into the rest position in response to the vehicle exiting from the track guided rail section.

3. Safety device according claim 2, wherein the monitoring means and control signal means include a column installed at a driver side road edge with a removable control pin in flexible electrically conductive connection therewith, which control pin can be manually plugged into a socket arranged in the interior of the vehicle and serving as a vehicle side signal receiving and signal transmission device.

4. Safety device according to claim 2, wherein the monitoring means for the sensing roller rest position actuates signal lamps arranged in the driver's field of vision.

5. Safety device according to claim 2, wherein the control signal means contains a time witch relay for the optical indicator device for controlling the optical indicator device to be in said go mode signal for a predetermined period of time after being switched thereto.

6. Safety device according to claim 1, wherein said monitoring means and control signal means include wireless signal transmitting means for transmitting signals between the vehicle and portion or the monitoring means and control signal means located adjacent the road.

7. Safety device according to claim 1, wherein the monitoring means for the sensing roller rest position is constructed as a limit position switch actuated by the sensing roller in its rest position.

8. Safety device according to claim 7, wherein the monitoring means and control signal means include a column installed at a driver side road edge with a removable control pin in flexible electrically conductive connection therewith, which control pin can be manually plugged into a socket arranged in the interior of the vehicle and serving as an vehicle side signal receiving and signal transmission device.

9. Safety device according to claim 8, wherein the monitoring means for the sensing roller rest position actuates signal lamps arranged in the driver's field of vision.

10. Safety device according to claim 9, wherein the control signal means contains a time switch relay for the optical indicator device for controlling the optical indicator device to be in said go mode signal for a predetermined period of time after being switched thereto.

11. Safety device according to claim 1, wherein the monitoring means for the sensing roller rest position actuates signal lamps arranged in the driver's field of vision.

12. Safety device according to claim 1, wherein the control signal means contains a time switch relay for the optical indicator device for controlling the optical indicator device to be in said go mode signal for a predetermined period of time after being switched thereto.

* * * * *